(12) United States Patent
Hamilton et al.

(10) Patent No.: US 8,215,455 B1
(45) Date of Patent: Jul. 10, 2012

(54) GREASING SYSTEM FOR FIFTH WHEEL OF TRUCKS

(76) Inventors: Harvey H. Hamilton, Demopolis, AL (US); Debbie Hamilton, Demopolis, AL (US)

( * ) Notice: Subject to any disclaimer, the term of this patent is extended or adjusted under 35 U.S.C. 154(b) by 239 days.

(21) Appl. No.: 12/711,789

(22) Filed: Feb. 24, 2010

(51) Int. Cl.
*F01M 11/12* (2006.01)

(52) U.S. Cl. .......................... 184/29; 184/6.4; 184/6.19

(58) Field of Classification Search .................. 184/29, 184/14, 6.4
See application file for complete search history.

(56) References Cited

U.S. PATENT DOCUMENTS

| | | | |
|---|---|---|---|
| 1,465,620 A * | 8/1923 | Anderson | 184/39 |
| 3,743,054 A * | 7/1973 | Jones, Jr. | 184/14 |
| 4,541,651 A * | 9/1985 | Koster | 280/433 |
| 5,165,714 A * | 11/1992 | Kaim | 280/433 |
| 5,417,308 A * | 5/1995 | Hartl | 184/6.4 |
| 6,098,754 A * | 8/2000 | Toner | 184/14 |
| 6,199,889 B1 * | 3/2001 | Golembiewski et al. | 280/433 |
| 6,874,599 B1 * | 4/2005 | Riskedal | 184/105.3 |
| 2008/0185228 A1 * | 8/2008 | Gallego et al. | 184/6.19 |

FOREIGN PATENT DOCUMENTS

FR 2555110 * 11/1983

* cited by examiner

*Primary Examiner* — William E Dondero
*Assistant Examiner* — Michael Riegelman

(57) ABSTRACT

A greasing system featuring a fifth wheel of a truck having a grease vein with four ports disposed therein, each port being fluidly connected to a fitting; a grease pump operatively connected to an air switch which turns on and off the grease pump; a main tube fluidly connected to the grease pump, the main tube bifurcates into a first delivery tube fluidly connected to the first fitting and a second delivery tube fluidly connected to the second fitting; and a third delivery tube fluidly connected to the first fitting and to the third fitting, and a fourth delivery tube fluidly connected to the second fitting and to the fourth fitting; wherein when the grease pump is activated the grease pump pumps grease to the ports in the grease vein of the fifth wheel.

7 Claims, 3 Drawing Sheets

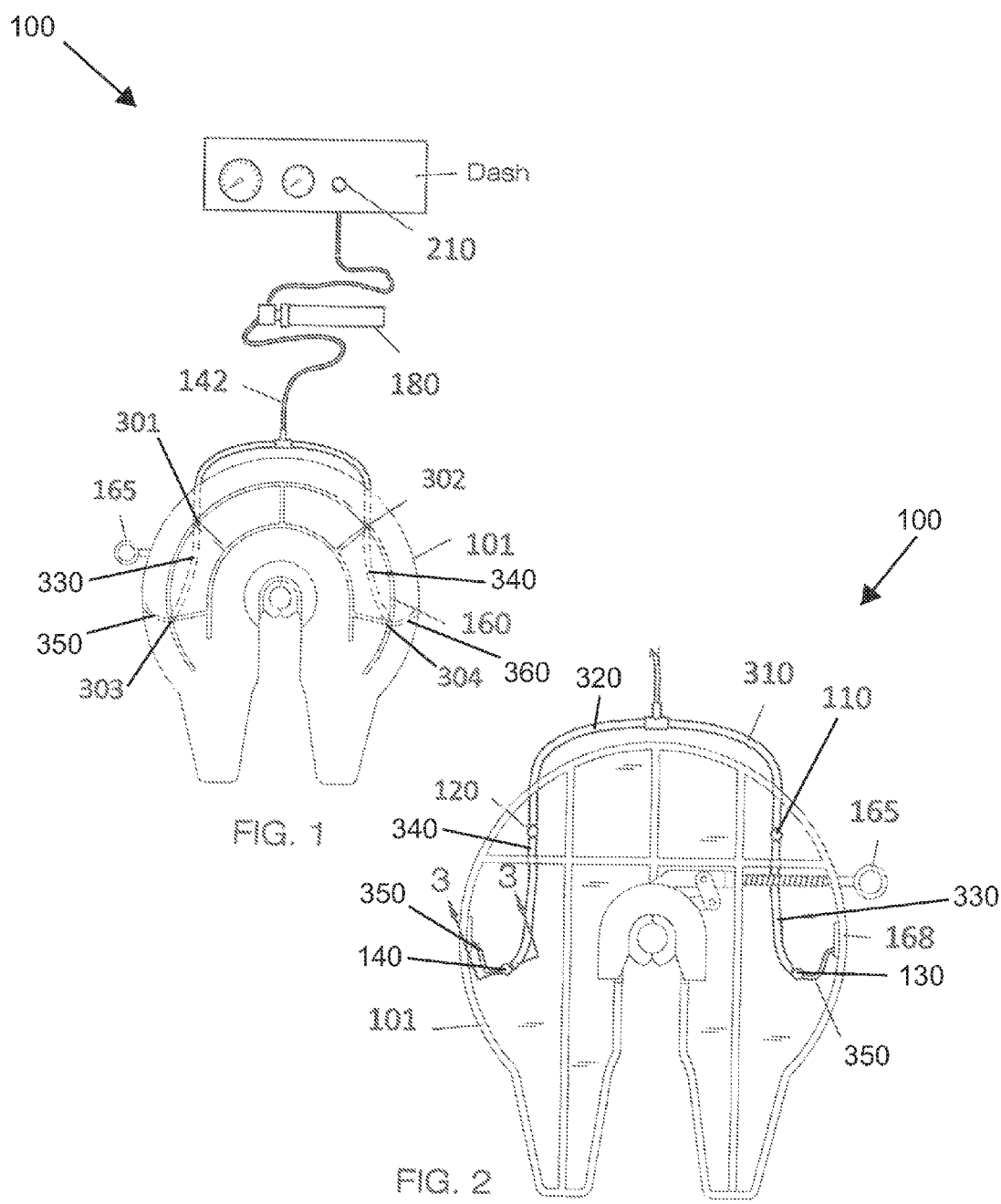

GREASING SYSTEM FOR FIFTH WHEEL OF TRUCKS

FIELD OF THE INVENTION

The present invention is directed to a system for greasing the fifth wheel of a truck, more particularly to a system that can be operated remotely.

BACKGROUND OF THE INVENTION

Lubricating a fifth wheel of a truck can be a very time consuming and complicated task. The present invention features a greasing system for fifth wheels of trucks. The greasing system of the present invention can be operated remotely, which provides a more convenient and efficient means of lubricating the fifth wheel.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a greasing system comprising a fifth wheel of a truck having a grease vein, wherein a first port, a second port, a third port, and a fourth port are each disposed in the grease vein; a first fitting fluidly connected to the first port, a second fitting fluidly connected to the second port, a third fitting fluidly connected to the third port, and a fourth fitting fluidly connected to the fourth port;

a grease pump operatively connected to an air switch, the air switch functions to turn on and off the grease pump; a main tube fluidly connected to the grease pump, the main tube bifurcates into a first delivery tube and a second delivery tube, the first delivery tube is fluidly connected to the first fitting and the second delivery tube is fluidly connected to the second fitting; and a third delivery tube having a first end fluidly connected to the first fitting and a second end fluidly connected to the third fitting, and a fourth delivery tube having a first end fluidly connected to the second fitting and a second end fluidly connected to the fourth fitting; wherein when the grease pump is activated the grease pump pumps grease to the ports in the grease vein of the fifth wheel.

In some embodiments, the air switch is mounted on a dash of the truck. In some embodiments, the main tube, the first delivery tube, the second delivery tube, the third delivery tube, or the fourth delivery tube is constructed from oil-resistant tubing. In some embodiments, the main tube, the first delivery tube, the second delivery tube, the third delivery tube, or the fourth delivery tube is a ¼ inch tube.

In some embodiments, the greasing system further comprises a fifth delivery tube fluidly connected to the third fitting, the fifth delivery tube functions to deliver grease to a pivot point in the fifth wheel. In some embodiments, the greasing system further comprises a sixth delivery tube fluidly connected to the fourth fitting, the sixth delivery tube functions to deliver grease to a pivot point in the fifth wheel.

In some embodiments, the fifth delivery tube is a ⅛ inch tube. In some embodiments, the sixth delivery tube is a ⅛ inch tube. In some embodiments, the fifth wheel further comprises a release handle.

BRIEF DESCRIPTION OF THE DRAWINGS

FIG. 1 is a top view of the greasing system of the present invention.

FIG. 2 is a bottom and internal view of the greasing system of FIG. 1.

DESCRIPTION OF PREFERRED EMBODIMENTS

Figure 3:
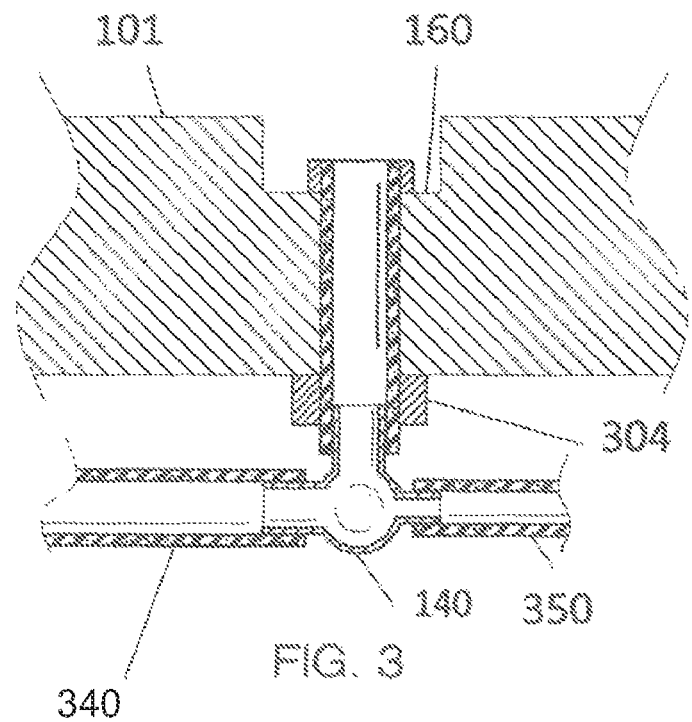
FIG. 3 is a cross sectional view of the greasing system of FIG. 2.
Figure 4:
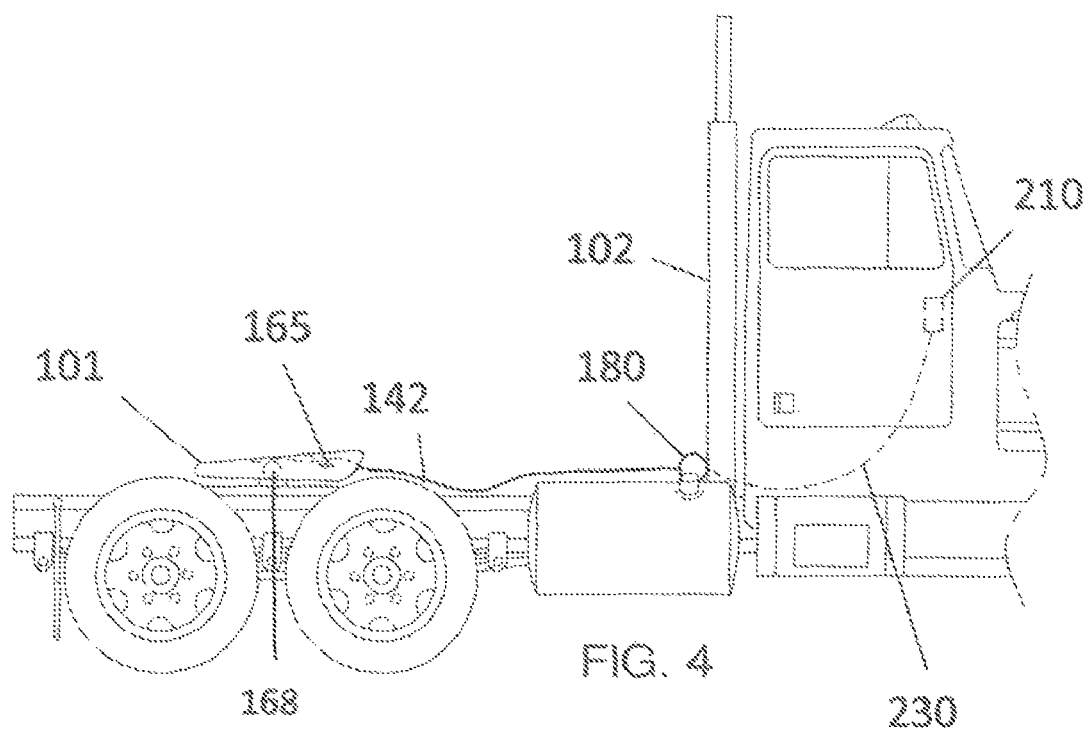
FIG. 4 is a side view of the greasing system of FIG. 1.
Figure 5:
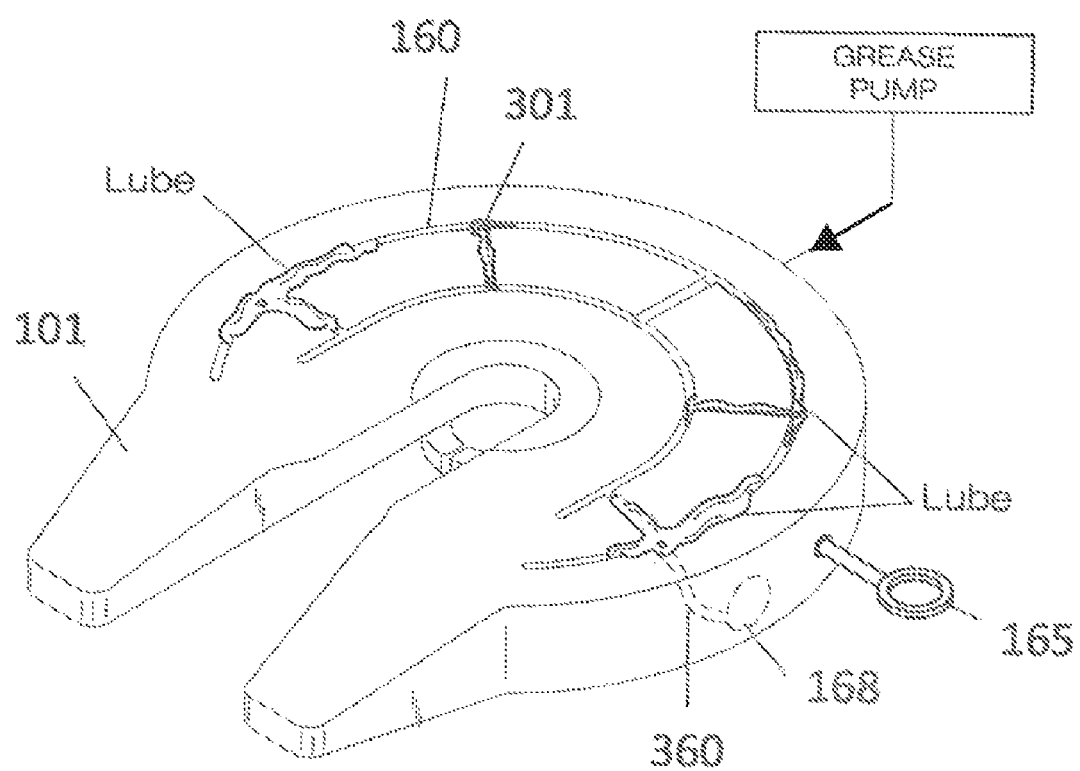
FIG. 5 is an in-use view of the greasing system of the present invention.

Referring now to FIGS. 1-5, the present invention features a greasing system 100 for greasing a fifth wheel 101 of a truck 102. The greasing system 100 can be operated remotely, which provides a more convenient and efficient means of lubricating the fifth wheel 101. Fifth wheels 101 are well known to one of ordinary skill in the art. An example of a fifth wheel 101 with grease veins 160, a pivot point 168, and a release handle 165 is shown in FIG. 5.

The greasing system 100 of the present invention comprises a grease pump 180 operatively connected to an air switch 210 (e.g., via one or more air lines 230). The air switch 210 may be mounted on the dash of the truck 102. The air switch 210 can turn on and off the grease pump 180. Activation of the grease pump 180 via the air switch 210 can cause the grease pump 180 to deliver grease to the fifth wheel 101 of the truck 102. In some embodiments, the grease pump 180 is operatively connected to an alternative means of remotely controlling the grease pump 180.

The grease pump 180 delivers grease to the fifth wheel 101 of the truck 102. In some embodiments, a main tube 142 (e.g., ¼ inch tube) is fluidly connected to the grease pump 180. The main tube 142 bifurcates into a first delivery tube 310 (e.g., ¼ inch tube) and a second delivery tube 320 (e.g., ¼ inch tube).

The first delivery tube 310 is fluidly connected to a first fitting 110, and the second delivery tube 320 is fluidly connected to a second fitting 120 (e.g., ¼ inch fitting). The first fitting 110 is installed in a first port 301 disposed in the fifth wheel 101, for example disposed in a grease vein 160. The second fitting 120 is installed in a second port 302 disposed in the fifth wheel 101, for example disposed in a grease vein 160. As shown in FIG. 1, the first port 301 and the second port 302 are both disposed in a grease vein 160 of the fifth wheel 101.

Fluidly connected to the first fitting 110 in the first port 301 is a third delivery tube 330 (e.g., ¼ inch tube). For example the first end of the third delivery tube 330 is fluidly connected to the first fitting 110. Fluidly connected to the second fitting 120 in the second port 302 is a fourth delivery tube 340 (e.g., ¼ inch tube). For example the first end of the fourth delivery tube 340 is fluidly connected to the second fitting 120. The second end of the third delivery tube 330 is fluidly connected to a third fitting 130 disposed in a third port 303 in a grease vein 160 of the fifth wheel 101. The second end of the fourth delivery tube 340 is fluidly connected to a fourth fitting 140 disposed in a fourth port 304 in a grease vein 160 of the fifth wheel 101.

Lubrication (e.g., grease) is delivered from the grease pump 180 to the first port 301 via the main tube 142, the first delivery tube 310, and the first fitting 110. Lubrication is delivered from the grease pump 180 to the second port 302 via the main tube 142, the second delivery tube 320, and the second fitting 120.

Lubrication is delivered from the grease pump 180 to the third port 303 via the main tube 142, the first delivery tube 310, the first fitting 110, the third delivery tube 330, and the third fitting 130. Lubrication is delivered from the grease pump 180 to the fourth port 304 via the main tube 142, the second delivery tube 310, the second fitting 120, the fourth delivery tube 340, and the fourth fitting 140.

In some embodiments, a fifth delivery tube 350 (e.g., ⅛ inch tube) is fluidly connected to the third fitting 130. The fifth delivery tube 350 functions to deliver grease to a pivot point in the fifth wheel 101. In some embodiments, a sixth delivery tube 360 (e.g., ⅛ inch tube) is fluidly connected to the fourth fitting 140. The sixth delivery tube 360 functions to deliver grease to a pivot point 168 in the fifth wheel 101.

In some embodiments, the tubes, for example the main tube 142, the first delivery tube 310, the second delivery tube 320, the third delivery tube 330, the fourth delivery tube 340, the fifth delivery tube 350, and/or the sixth delivery tube 360 are constructed from oil-resistant tubing. The oil-resistant tubing helps prevent the breakdown of the tubing due to contact with oil.

The four ports 301, 302, 303, 304 are disposed in grease veins 160 in the fifth wheel 101. The ports may be arranged evenly throughout the grease veins 160. In some embodiments, two ports are disposed in the front and two are in the rear. For example, the first port 301 and the second port 302 may be positioned in the front and the third port 303 and the fourth port 304 may be positioned in the rear.

The following the disclosures of the following U.S. patents are incorporated in their entirety by reference herein: U.S. Pat. No. 6,874,599; U.S. Pat. Application No. 2008/0185228; U.S. Pat. No. 5,417,308; U.S. Pat. No. 4,541,651; U.S. Pat. No. 6,098,754; U.S. Pat. No. 3,743,054.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A greasing system comprising:
   (a) a fifth wheel of a truck having a grease vein, wherein a first port, a second port, a third port, and a fourth port are each disposed in the grease vein;
   (b) a first fitting directly connected to the first port, a second fitting directly connected to the second port, a third fitting directly connected to the third port, and a fourth fitting directly connected to the fourth port;
   (c) a grease pump operatively connected to an air switch, the air switch functions to turn on and off the grease pump;
   (d) a main tube directly connected to the grease pump, the main tube bifurcates into a first delivery tube and a second delivery tube, the first delivery tube is directly connected to the first fitting and the second delivery tube is directly connected to the second fitting;
   (e) a third delivery tube having a first end directly connected to the first fitting and a second end directly connected to the third fitting, and a fourth delivery tube having a first end directly connected to the second fitting and a second end directly connected to the fourth fitting;
   wherein the system further comprises a fifth delivery tube directly connected to the third fitting, the fifth delivery tube functions to deliver grease to a pivot point in the fifth wheel, wherein the system further comprises a sixth delivery tube directly connected to the fourth fitting, the sixth delivery tube functions to deliver grease to a pivot point in the fifth wheel, wherein when the grease pump is activated the grease pump pumps grease to the ports in the grease vein of the fifth wheel.

2. The greasing system of claim 1, wherein the air switch is mounted on a dash of the truck.

3. The greasing system of claim 1, wherein the main tube, the first delivery tube, the second delivery tube, the third delivery tube, or the fourth delivery tube is constructed from oil-resistant tubing.

4. The greasing system of claim 1, wherein the main tube, the first delivery tube, the second delivery tube, the third delivery tube, or the fourth delivery tube is a ¼ inch tube.

5. The greasing system of claim 1, wherein the fifth delivery tube is a ⅛ inch tube.

6. The greasing system of claim 1, wherein the sixth delivery tube is a ⅛ inch tube.

7. The greasing system of claim 1, wherein the fifth wheel further comprises a release handle.

\* \* \* \* \*